(12) United States Patent
Du et al.

(10) Patent No.: US 12,446,879 B1
(45) Date of Patent: Oct. 21, 2025

(54) MAGNETIC HYDROGEL, PREPARATION METHOD THEREOF AND NON-INVASIVE SKIN MECHANICAL LOADING DEVICE

(71) Applicant: The First Affiliated Hospital of Xi'an Jiaotong University, Xi'an (CN)

(72) Inventors: Huicong Du, Xi'an (CN); Renjianzhi Zhang, Xi'an (CN); Maoguo Shu, Xi'an (CN); Juan Wu, Xi'an (CN)

( * ) Notice: Subject to any disclaimer, the term of this patent is extended or adjusted under 35 U.S.C. 154(b) by 0 days.

(21) Appl. No.: 19/189,216

(22) Filed: Apr. 24, 2025

(30) Foreign Application Priority Data

Jan. 15, 2025 (CN) .......................... 202510058579.5

(51) Int. Cl.
| | | |
|---|---|---|
| A61B 17/08 | (2006.01) | |
| A61B 17/00 | (2006.01) | |
| A61L 26/00 | (2006.01) | |
| C08L 5/04 | (2006.01) | |
| C08L 89/06 | (2006.01) | |

(52) U.S. Cl.
CPC ........ A61B 17/085 (2013.01); A61L 26/0052 (2013.01); A61L 26/008 (2013.01); C08L 5/04 (2013.01); C08L 89/06 (2013.01); *A61B 2017/00876* (2013.01)

(58) Field of Classification Search
CPC .................. A61B 17/08; A61B 17/085; A61B 2017/00876; A61B 2017/081; A61L 26/0052; A61L 26/008; C08L 5/04; C08L 89/06
See application file for complete search history.

(56) References Cited

FOREIGN PATENT DOCUMENTS

| | | |
|---|---|---|
| CN | 111803697 A | 10/2020 |
| CN | 115979113 A | 4/2023 |
| CN | 118557791 A | 8/2024 |

*Primary Examiner* — Robert A Lynch
(74) *Attorney, Agent, or Firm* — Addison D. Ault; IPGentleman Intellectual Property Services, LLC (57) ABSTRACT

A preparation method of a magnetic hydrogel includes steps as follows. A gelatin solution, a sodium alginate solution, deionized water, and NdFeB particles are mixed thoroughly to obtain a reaction precursor A solution. Calcium carbonate, gluconolactone, transglutaminase, and deionized water are mixed thoroughly to obtain a reaction precursor B solution. The reaction precursor solution A is added into the reaction precursor solution B to stir thoroughly and mix to obtain a mixture, followed by sealing the mixture to place in a constant-temperature environment to obtain the magnetic hydrogel of GA-Al@NdFeB. The magnetic hydrogel of GA-Al@NdFeB is magnetized, thereby endowing the NdFeB particles embedded within the magnetic hydrogel of GA-Al@NdFeB with magnetic polarity to obtain a magnetized magnetic hydrogel of GA-Al@NdFeB. By using the magnetic hydrogels, mechanical loading of skin wounds can be achieved, wound contraction is promoted, and the purpose of wound repair is achieved.

5 Claims, 5 Drawing Sheets

MAGNETIC HYDROGEL, PREPARATION METHOD THEREOF AND NON-INVASIVE SKIN MECHANICAL LOADING DEVICE

CROSS-REFERENCE TO RELATED APPLICATION

This application claims priority to Chinese Patent Application No. 202510058579.5, filed on Jan. 15, 2025, which is herein incorporated by reference in its entirety.

TECHNICAL FIELD

The disclosure relates to the field of skin mechanic loading technologies, and particularly to a magnetic hydrogel, a preparation method thereof and a non-invasive skin mechanical loading device.

BACKGROUND

Skin, as the largest tissue in the human body, is highly susceptible to injury. Wound healing is often prolonged and complicated by various factors, posing a significant threat to health of patients. Chronic wounds have characteristics of complex pathogenesis, high treatment difficulty, long treatment duration, and high costs, which severely affect people's physical and mental health as well as the quality of life. Therefore, how to effectively promote wound healing and reduce the economic burden of medical treatment has become an urgent clinical issue that needs to be addressed in the field of surgery.

Wound healing is closely related to skin contraction, and surgical suturing technique and skin stretching technique are also based on a principle of contracting the wound to promote its repair. However, many chronic wounds cannot be directly sutured. Skin expander, which works by inserting two Kirschner wires through the skin surrounding the wound to stretch the skin and install the skin expander, can cause secondary injury to the wound and affect its blood circulation. Moreover, these devices are expensive. Therefore, developing a device that can apply mechanical loading to the skin wound in a minimally invasive or non-invasive manner to promote wound contraction and achieve the goal of wound repair would bring great convenience to the wound healing. In recent years, use of physical methods such as magnetism, sound, light, and electricity to treat major diseases in a minimally invasive or even non-invasive way has become a priority. Development of new regulatory devices and systems based on physical methods and the exploration of non-invasive, safe, and effective therapeutic methods have been highly valued. Establishment of higher-precision physical regulatory methods has also been given great importance. Magnetic-related technologies have been widely used in many fields of clinical surgery, and their safety within the human body has been proven. In addition, studies have also shown that static magnetic fields and magnetic nanoparticles can promote cell proliferation, cell migration and enhance angiogenesis. Low-dose magnetic nanoparticles are safe and non-damaging to the body and have been approved by the U.S. Food and Drug Administration (FDA) for the treatment of iron-deficiency anemia. Magnetic nanomaterials are a new type of magnetic material. Compared with ferromagnets, the magnetic nanoparticles have a good magnetic response after being subjected to an external magnetic field, and their remanence and coercivity tend to zero after the magnetic field is removed. Based on their unique physicochemical properties, the magnetic nanoparticles have been applied in in vitro diagnostics and clinical treatments, including cell diagnostics, tissue repair, drug delivery, magnetic resonance imaging (MRI), magnetic hyperthermia therapy, and magnetofection. Neodymium iron boron (NdFeB) nanoparticles are commonly used magnetic nanomaterials that can connect a variety of bioactive molecules and have strong biocompatibility, making them widely used in the medical field. The NdFeB magnetic nanomaterials generate a magnetic field after being magnetized. Therefore, when two NdFeB magnetic nanomaterials are placed on either side of a wound and driven to move towards each other, a counteracting force of relative movement will be generated between the two NdFeB magnetic nanomaterials, making it difficult to precisely control them with an external magnetic field, difficult to apply mechanical loading to the wound, difficult to promote wound contraction, and difficult to achieve the goal of wound repair.

SUMMARY

Aiming at the deficiencies in the related art, the objective of the disclosure is to provide magnetic hydrogel, a preparation method thereof and a non-invasive skin mechanical loading device, in order to address the issues raised in the background. The prepared magnetic hydrogel can rapidly respond to an external magnetic field, generating attractive or repulsive forces towards the magnetic field. By regulating the external magnetic field, directional forces can be produced in specific directions to achieve mechanical loading on a wound. Meanwhile, taking advantage of a good biocompatibility of the magnetic hydrogel, the non-invasive skin mechanical loading device including the magnetic hydrogel can be applied on two sides of the wound. The magnetic forces generated will act on the wound, pulling it to contract and thereby promoting the healing of the wound.

To solve above problems, a preparation method of a magnetic hydrogel is provided, and the preparation method includes steps as follow.

Specifically, a gelatin solution, a sodium alginate solution, deionized water, and neodymium iron boron (NdFeB) particles are mixed thoroughly to obtain a reaction precursor A solution. Calcium carbonate, gluconolactone, transglutaminase, and deionized water are mixed thoroughly in a reaction precursor B solution. The reaction precursor solution A is added into the reaction precursor solution B to stir and mix thoroughly to obtain a mixture, followed by sealing the mixture to place in a constant-temperature environment to obtain a magnetic hydrogel of GA-Al@NdFeB. The magnetic hydrogel of GA-Al@NdFeB is magnetized, thereby endowing the NdFeB particles embedded within the magnetic hydrogel of GA-Al@NdFeB with magnetic polarity to obtain the magnetized magnetic hydrogel of GA-Al@NdFeB. A magnetizing voltage of a pulse magnetizer is 3000 volts (V), a magnetizing capacitor is 5000 micro farads (U F), and a magnetic field strength is 7 Tesla (T).

In an embodiment, the gelatin solution with a mass percentage in a range of 18% to 22%, the sodium alginate solution with a mass percentage in a range of 0.8% to 1.2%, the deionized water, and the NdFeB particles are mixed thoroughly to obtain the reaction precursor A solution. Before obtaining the magnetic hydrogel of GA-Al@NdFeB, the reaction precursor solution A is added into the reaction precursor solution B to stir and mix thoroughly to obtain the mixture, followed by sealing the mixture to place in the constant-temperature environment with a temperature in a range of 37° C. to 40° C. for 2 hours (h) to 3 h.

In an embodiment, a volume-to-weight ratio of the gelatin solution, the sodium alginate solution, the deionized water, and the NdFeB particles is 10:5:1:10, and a volume-to-weight ratio of the calcium carbonate, the gluconolactone, the transglutaminase, and the deionized water is 0.02:0.04:0.2:4.

In an embodiment, a particle size of the NdFeB particles is in a range of 5 micrometers (μm) to 10 μm.

The magnetic hydrogel is prepared from the preparation method mentioned above.

A non-invasive skin mechanical loading device is provided.

The non-invasive skin mechanical loading device includes at least one pair of magnetized magnetic hydrogels of GA-Al@NdFeB and driving magnets. Magnetic poles of the at least one pair of magnetized magnetic hydrogels of GA-Al@ NdFeB are opposite, the at least one pair of magnetized magnetic hydrogels of GA-Al@NdFeB are applied symmetrically on two sides of a skin wound, respectively, and are closely attached to edges of the two sides of the skin wound. The driving magnets correspond to the at least one pair of magnetized magnetic hydrogels of GA-Al@NdFeB in a one-to-one manner, and each of the driving magnets is arranged on a side of corresponding one of the at least one pair of magnetized magnetic hydrogels of GA-Al@NdFeB far away from the skin wound. The driving magnets are configured to oppositely push the skin wound from the two sides of the skin wound; magnetic poles of the driving magnets are same as the magnetic poles of the at least one pair of magnetized magnetic hydrogels of GA-Al@ NdFeB, respectively, thereby generating repulsive forces between the driving magnets and the at least one pair of magnetized magnetic hydrogels of GA-Al@NdFeB, and the at least one pair of magnetized magnetic hydrogels of GA-Al@ NdFeB are pushed by the repulsive forces to achieve a traction wound contraction.

In an embodiment, the non-invasive skin mechanical loading device is configured to change distances between the driving magnets and the two magnetized magnetic hydrogels of GA-Al@NdFeB, to thereby control the repulsive forces.

Compared to the related art, the beneficial effects of the disclosure are as follows.

1. The disclosure provides the magnetic hydrogel of GA-Al@ NdFeB prepared by the reaction of the reaction precursor A solution and the reaction precursor B solution, and the magnetic hydrogel of GA-Al@NdFeB is magnetized to obtain the magnetized magnetic hydrogel of GA-Al@NdFeB. The magnetized magnetic hydrogel of GA-Al@NdFeB is not only a composite material with both magnetic responsiveness and biocompatibility, but also can respond quickly to external magnetic fields. The magnetized magnetic hydrogels of GA-Al@ NdFeB are applied symmetrically on two sides of a skin wound, respectively. When the magnetized magnetic hydrogels of GA-Al@NdFeB are driven to oppositely move relative to each other to a wound, an opposite movement reaction force will not be generated between the two magnetized magnetic hydrogels of GA-Al@NdFeB, so as to achieve accurate regulation through the external magnetic field, and then precisely control directions and sizes of the generated magnetic force by regulating the direction and distance of the external magnetic field, so as to carry out mechanical loading on the wound. Meanwhile, taking advantage of a good biocompatibility of the magnetic hydrogel, the non-invasive skin mechanical loading device including the magnetic hydrogel can be applied on two sides of the wound. The magnetic forces generated will act on the wound, pulling it to contract and thereby promoting the healing of the wound.

2. The disclosure achieves a goal of safe and non-invasive promotion of wound repair by preparing a non-invasive skin mechanical loading device, and improves the clinical treatment effect of chronic wounds.

DETAILED DESCRIPTION OF EMBODIMENTS

In order to make the above objectives, features, and advantages of the embodiments of the disclosure more obvious and understandable, the technical solutions in the embodiments of the disclosure will be clearly and completely described below in conjunction with the attached drawings. Apparently, the described embodiments are only a part of the embodiments of the disclosure, not all embodiments. Based on the embodiments of the disclosure. All other embodiments obtained by those skilled in the art without creative labor are within the scope of protection of the disclosure.

A magnetic hydrogel of GA-Al@NdFeB is a composite material with both magnetic responsiveness and biocompatibility. The composite material can quickly respond to external magnetic fields, generating an attraction force or a repulsion force to the external magnetic fields. The directionality and magnitude of a magnetic force can be controlled by adjusting a direction and a distance of the external magnetic field. Using the good biocompatibility of the magnetic hydrogel, it can be attached to two sides of the wound to make the generated magnetic force act on the wound, pull the wound to shrink, and promote wound repair.

In view of this, the disclosure provides a magnetic hydrogel, a preparation method thereof and a non-invasive skin mechanical loading device. By preparing the magnetic hydrogel and magnetizing the prepared magnetic hydrogel to obtain a magnetized magnetic hydrogel, the magnetized hydrogel is applied in the non-invasive skin mechanical loading device to achieve mechanical loading on skin wounds, promote wound contraction, and thereby accomplishing the goal of wound repair.

As shown in FIGS. 1A-6, the preparation method of the magnetic hydrogel includes steps as follows.

A gelatin solution, a sodium alginate solution, deionized water, and NdFeB particles are mixed thoroughly to obtain a reaction precursor A solution. Calcium carbonate, gluconolactone, transglutaminase, and deionized water are mixed thoroughly to obtain a reaction precursor B solution. The reaction precursor solution A is added into the reaction precursor solution B to stir and mix thoroughly to obtain a mixture, followed by sealing the mixture to place in a constant-temperature environment to obtain the magnetic hydrogel of GA-Al@NdFeB. The magnetic hydrogel of GA-Al@NdFeB is magnetized, thereby endowing the NdFEB particles embedded within the magnetic hydrogel of GA-Al@NdFeB with magnetic polarity to obtain the magnetized magnetic hydrogel of GA-Al@NdFeB. A magnetizing voltage of a pulse magnetizer is 3000 V, a magnetizing capacitor is 5000 UF, and a magnetic field strength is 7 T.

In an embodiment, the gelatin solution with a mass percentage in a range of 18% to 22%, the sodium alginate solution with a mass percentage in a range of 0.8% to 1.2%, the deionized water, and the NdFeB particles are mixed thoroughly to obtain the reaction precursor A solution for the reaction. Before obtaining the magnetic hydrogel of GA-Al@NdFeB, the reaction precursor solution A is added into the reaction precursor solution B to stir and mix thoroughly to obtain the mixture, followed by sealing the mixture to place in the constant-temperature environment with a temperature in a range of 37° C. to 40° C. for 2 h to 3 h.

In an embodiment, a volume-to-weight ratio of the gelatin solution with a mass percent concentration of 20%, the sodium alginate solution with a mass percent concentration of 1%, the deionized water, and the NdFEB particles is 10:5:1:10, and a volume-to-weight ratio of the calcium carbonate, the gluconolactone, the transglutaminase, and the deionized water is 0.02:0.04:0.2:4.

In an embodiment, a particle size of the NdFeB particles is in a range of 5 μm to 10 μm.

The magnetic hydrogel is prepared from the preparation method mentioned above.

In an embodiment, a non-invasive skin mechanical loading device is provided.

The non-invasive skin mechanical loading device includes at least one pair of two magnetized magnetic hydrogels of GA-Al@NdFeB and driving magnets. Magnetic poles of the two magnetized magnetic hydrogels of GA-Al@NdFeB are opposite, the two magnetized magnetic hydrogels of GA-Al@NdFeB are applied symmetrically on two sides of a skin wound, respectively, and are closely attached to edges of the two sides of the skin wound. The driving magnets correspond to the two magnetized magnetic hydrogels of GA-Al@NdFeB in a one-to-one manner, and each of the driving magnets is arranged on a side of corresponding one of the two magnetized magnetic hydrogels of GA-Al@NdFeB far away from the skin wound. The driving magnets are configured to oppositely push the skin wound from the two sides of the skin wound. Magnetic poles of the driving magnets are same as the magnetic poles of the two magnetized magnetic hydrogels of GA-Al@NdFeB, respectively, thereby generating repulsive forces between the driving magnets and the two magnetized magnetic hydrogels of GA-Al@NdFeB, and the two magnetized magnetic hydrogels of GA-Al@NdFeB are pushed by the repulsive forces to achieve a traction wound contraction.

In an embodiment, the non-invasive skin mechanical loading device is configured to change distances between the driving magnets and the two magnetized magnetic hydrogels of GA-Al@NdFeB, to thereby control the repulsive forces.

Embodiment 1

A preparation method of a magnetic hydrogel includes steps as follows.

10 milliliters (mL) of a gelatin solution with a mass percentage of 20%, 5 mL of a sodium alginate solution with a mass percentage of 1%, 1 mL of deionized water, and 10 grams (g) of NdFeB particles with a particle size of 5 μm are mixed thoroughly to obtain a reaction precursor A solution.

0.02 g of calcium carbonate, 0.04 g of gluconolactone (GDL), 0.2 g of transglutaminase (TG), and 4 mL of deionized water are mixed thoroughly to obtain a reaction precursor B solution.

The reaction precursor solution A is added into the reaction precursor solution B to stir and mix thoroughly to obtain the mixture, followed by transferring the mixture in a mold, and then the mold with the mixture is sealed to place in the constant-temperature environment with a temperature of 37° C. for 2 h, to thereby obtain the magnetic hydrogel of GA-Al@NdFeB.

Then the magnetic hydrogel of GA-Al@NdFeB is cut into a uniform specification of 10 millimeters (mm)×10 mm×2 mm for standby.

The cut magnetic hydrogel is magnetized through a pulse magnetization meter. Specific parameters of the pulse magnetization meter include a magnetizing voltage of 3000V, a magnetizing capacitor of 5000 UF, and a magnetic field strength of 7 T. The magnetic hydrogel can be magnetized immediately after startup.

A number of the magnetized magnetic hydrogels of GA-Al@NdFeB is two, magnetic poles of the two magnetized magnetic hydrogels of GA-Al@NdFeB are opposite, the two magnetized magnetic hydrogels of GA-Al@NdFeB are applied symmetrically on two sides of a skin wound, respectively, and are closely attached to edges of the two sides of the skin wound.

A number of driving magnets is two, each of the two driving magnets is arranged on a side of corresponding one of the two magnetized magnetic hydrogels of GA-Al@NdFEB far away from the skin wound. Magnetic poles of the two driving magnets are same as the magnetic poles of the two magnetized magnetic hydrogels of GA-Al@NdFeB, respectively. By attaching the two driving magnets on outsides of the two magnetic hydrogels, repulsive forces generated between the driving magnets and the magnetic hydrogels push the magnetic hydrogel to realize the traction wound contraction.

Embodiment 2

A preparation method of a magnetic hydrogel includes steps as follows.

10 mL of a gelatin solution with a mass percentage of 18%, 5 mL of a sodium alginate solution with a mass percentage of 0.8%, 1 mL of deionized water, and 10 g of NdFeB particles with a particle size of 8 μm are mixed thoroughly to obtain a reaction precursor A solution.

0.02 g of calcium carbonate, 0.04 g of GDL, 0.2 g of TG, and 4 mL of deionized water are mixed thoroughly to obtain a reaction precursor B solution.

The reaction precursor solution A is added into the reaction precursor solution B to stir and mix thoroughly to obtain the mixture, followed by transferring the mixture in a mold, and then the mold with the mixture is sealed to place in the constant-temperature environment with a temperature of 38° C. for 2.5 h, to thereby obtain the magnetic hydrogel of GA-Al@NdFeB.

Then the magnetic hydrogel of GA-Al@NdFeB is cut into a uniform specification of 10 mm×10 mm×2 mm for standby.

The cut magnetic hydrogel is magnetized through a pulse magnetization meter. Specific parameters of the pulse magnetization meter include a magnetizing voltage of 3000V, a magnetizing capacitor of 5000 UF, and a magnetic field strength of 7 T. The magnetic hydrogel can be magnetized immediately after startup.

A number of the magnetized magnetic hydrogels of GA-Al@NdFeB is two, magnetic poles of the two magnetized magnetic hydrogels of GA-Al@NdFeB are opposite, the two magnetized magnetic hydrogels of GA-Al@NdFeB are applied symmetrically on two sides of a skin wound, respectively, and are closely attached to edges of the two sides of the skin wound.

A number of driving magnets is two, each of the two driving magnets is arranged on a side of corresponding one of the two magnetized magnetic hydrogels of GA-Al@NdFeB far away from the skin wound. Magnetic poles of the two driving magnets are same as the magnetic poles of the two magnetized magnetic hydrogels of GA-Al@NdFeB, respectively. By attaching the two driving magnets on outsides of the two magnetic hydrogels, repulsive forces generated between the driving magnets and the magnetic hydrogels push the magnetic hydrogel to realize the traction wound contraction.

Embodiment 3

A preparation method of a magnetic hydrogel includes steps as follows.

10 mL of a gelatin solution with a mass percentage of 22%, 5 mL of a sodium alginate solution with a mass percentage of 1.2%, 1 mL of deionized water, and 10 g of NdFeB particles with a particle size of 10 μm are mixed thoroughly to obtain a reaction precursor A solution.

0.02 g of calcium carbonate, 0.04 g of GDL, 0.2 g of TG, and 4 mL of deionized water are mixed thoroughly to obtain a reaction precursor B solution.

The reaction precursor solution A is added into the reaction precursor solution B to stir and mix thoroughly to obtain the mixture, followed by transferring the mixture in a mold, and then the mold with the mixture is sealed to place in the constant-temperature environment with a temperature of 40° C. for 3 h, to thereby obtain the magnetic hydrogel of GA-Al@NdFeB.

Then the magnetic hydrogel of GA-Al@NdFeB is cut into a uniform specification of 10 mm×10 mm×2 mm for standby.

The cut magnetic hydrogel is magnetized through a pulse magnetization meter. Specific parameters of the pulse magnetization meter include a magnetizing voltage of 3000V, a magnetizing capacitor of 5000 UF, and a magnetic field strength of 7 T. The magnetic hydrogel can be magnetized immediately after startup.

A number of the magnetized magnetic hydrogels of GA-Al@NdFeB is two, magnetic poles of the two magnetized magnetic hydrogels of GA-Al@NdFeB are opposite, the two magnetized magnetic hydrogels of GA-Al@NdFeB are applied symmetrically on two sides of a skin wound, respectively, and are closely attached to edges of the two sides of the skin wound.

A number of driving magnets is two, each of the two driving magnets is arranged on a side of corresponding one of the two magnetized magnetic hydrogels of GA-Al@NdFeB far away from the skin wound. Magnetic poles of the two driving magnets are same as the magnetic poles of the two magnetized magnetic hydrogels of GA-Al@NdFeB, respectively. By attaching the two driving magnets on outsides of the two magnetic hydrogels, repulsive forces generated between the driving magnets and the magnetic hydrogels push the magnetic hydrogel to realize the traction wound contraction.

The magnetic hydrogel can be prepared from the embodiments 1 to 3, and the prepared magnetic hydrogel is magnetized and used for non-invasive skin mechanical loading device for wound repair. Now, one of the embodiments 1-3 is selected, namely, the magnetic hydrogel prepared from the embodiment 1 carries out a SEM detection, a tensile test, a magnetic field distribution detection, a measurement of repulsion force on magnetic hydrogel at different distances, a biocompatibility test, preparation of mechanical loading devices of different sizes and animal in vivo experiments.

Experiment Part

1. SEM Detection of Magnetic Hydrogel of GA-Al@NdFeB

Figure 1A:
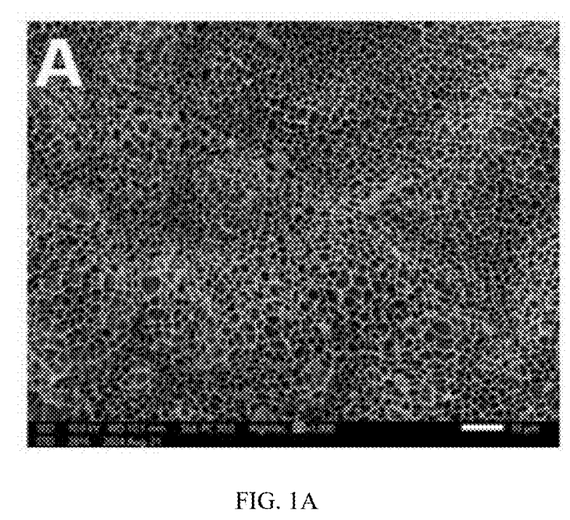
FIG. 1A illustrates a scanning electron microscope (SEM) image at 1000 times magnification to observe a network structure of a magnetic hydrogel and a distribution of NdFeB particles in a hydrogel network.
Figure 1B:
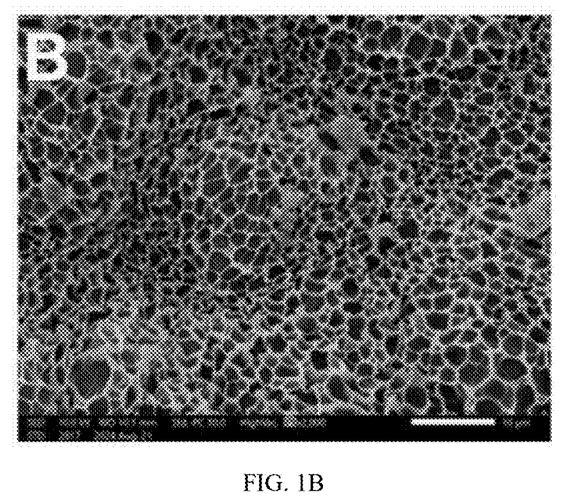
FIG. 1B illustrates a SEM image at 2000 times magnification to observe the network structure of the magnetic hydrogel and the distribution of NdFeB particles in the hydrogel network.
Figure 1C:
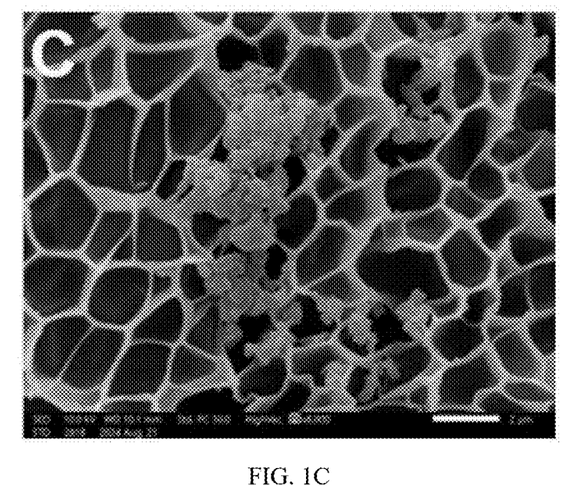
FIG. 1C illustrates a SEM image at 8000 times magnification to observe the network structure of the magnetic hydrogel and the distribution of NdFeB particles in the hydrogel network.

A network structure of the magnetic hydrogel and a distribution of NdFEB particles within the hydrogel network are observed using an SEM scanner. As shown in FIGS. 1A-1C, the magnetic hydrogel has a uniform porous structure with a relatively dense configuration. FIGS. 1A-1C represent SEM images at different magnifications. From FIGS. 1A-1C, it can be seen that the NdFeb particles are distributed on the pores, ensuring that the magnetic hydrogel has isotropic mechanical properties and magnetization capabilities.

2. Tensile Test of Magnetic Hydrogel of GA-Al@NdFeB

Figure 2A:
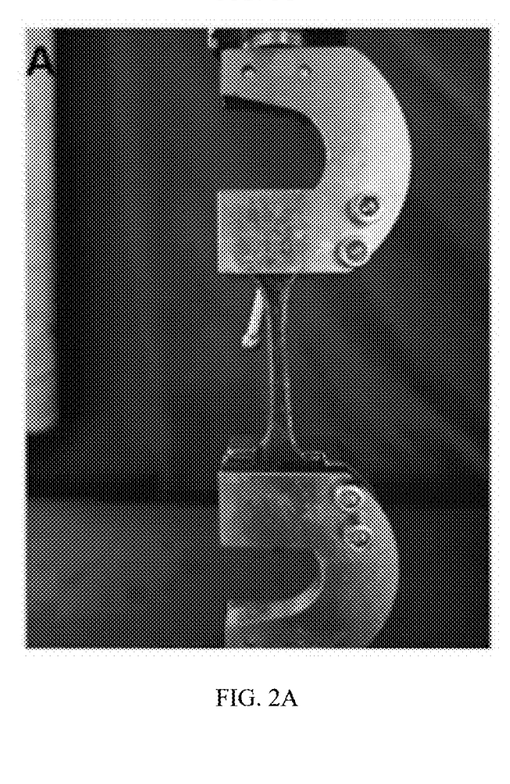
FIG. 2A illustrates an actual tensile test diagram of a tensile test of the magnetic hydrogel of GA-Al@NdFeB.
Figure 2B:
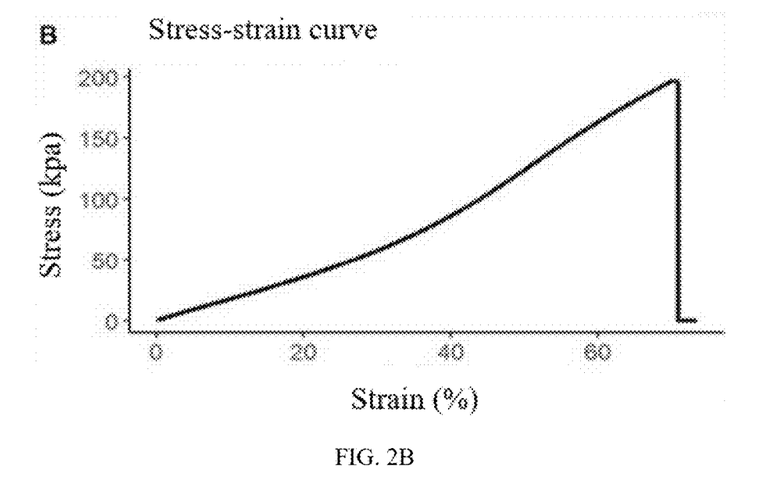
FIG. 2B illustrates a stress-strain curve of the tensile test of the magnetic hydrogel of GA-Al@NdFeB.

Two ends of dumbbell-shaped (tensile specimen) magnetic hydrogel are fixed at grips of an electronic universal testing machine. An initial position of each grip is adjusted so that the prepared magnetic hydrogel is fully extended and tension-free (as shown in FIG. 2A). After zero calibration of the universal testing machine, the grips are moved at a constant speed of 5 millimeters per minute (mm/min) to stretch the prepared magnetic hydrogel until it broke. A maximum stress at a time when the prepared magnetic hydrogel is broken is recorded, and a stress-strain curve is plotted based on the tensile stress and corresponding sample (i.e., prepared magnetic hydrogel) stretching length data (as shown in FIG. 2B). A value of Young's modulus is determined from the stress-strain curve. The value of Young's modulus is 395 kilopascals (kPa), indicating that the prepared magnetic hydrogel has high mechanical properties and can meet the requirements for subsequent mechanical loading.

3. Detection of Magnetic Field Distribution of Magnetic Hydrogel of GA-Al@NdFeB

Figure 3:
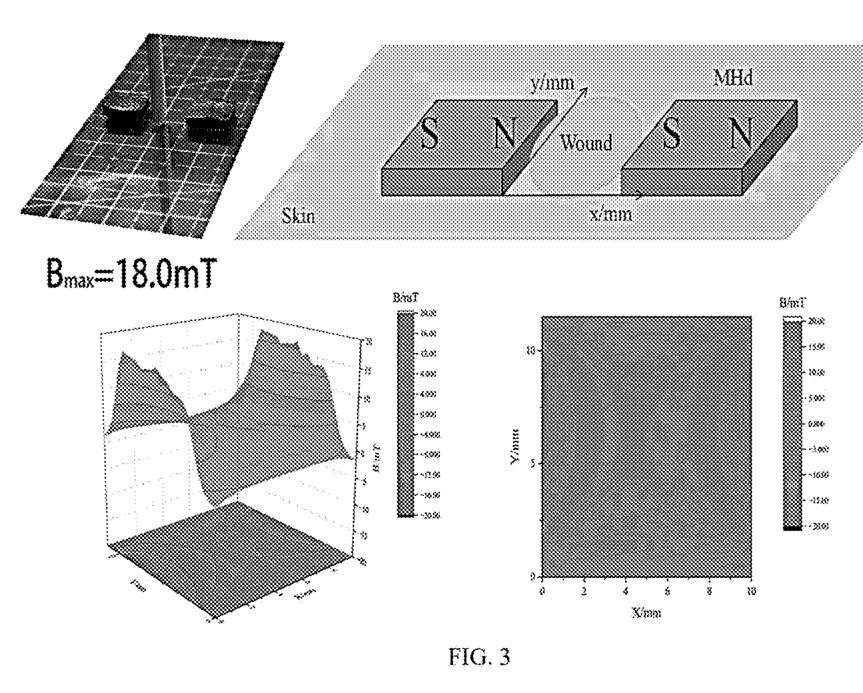
FIG. 3 illustrates a detection diagram of a magnetic field distribution of the magnetic hydrogel of GA-Al@NdFeB.

The prepared magnetic hydrogel of GA-Al@NdFeB is magnetized and then its spatial magnetic field distribution and intensity are detected using a spatial magnetic field distribution measurement system. As shown in FIG. 3, after being magnetized by a pulse magnetizer, the prepared magnetic hydrogel material exhibits magnetism, with the maximum magnetic field strength at the magnetic poles reaching 18 milli Tesla (mT), which is within a safety range.

4. The repulsive force generated between driving magnets and magnetized magnetic hydrogels of GA-Al@NdFeB is measured at different distances using a universal testing machine.

TABLE 1

Relationship between distance of the driving magnets and the magnetic hydrogels of GA-Al@NdFeB and the applied load on wound.

| Distance between driving magnets and magnetized magnetic hydrogels of GA-Al@NdFeB (mm) | Applied loading force on wound (N) |
|---|---|
| 2 | 0.081 |
| 4 | 0.044 |

As can be seen from Table 1, based on the principle that like magnetic poles repel each other, by adjusting the distance between the driving magnets and the magnetized magnetic hydrogels of GA-Al@NdFeB, different loading forces can be applied to the wound. For example, when the distance between the driving magnets and the magnetic hydrogels of GA-Al@NdFeB is 2 mm, the loading force applied to the wound is 0.081 N; when the distance is 4 mm, the loading force is 0.044 N. Therefore, by changing the distance between the driving magnets and the magnetized magnetic hydrogels of GA-Al@NdFeB, mechanical loading of different magnitudes can be applied to the wound.

5. Biocompatibility Test of Magnetic Hydrogel of GA-Al@NdFeB

Figure 4:
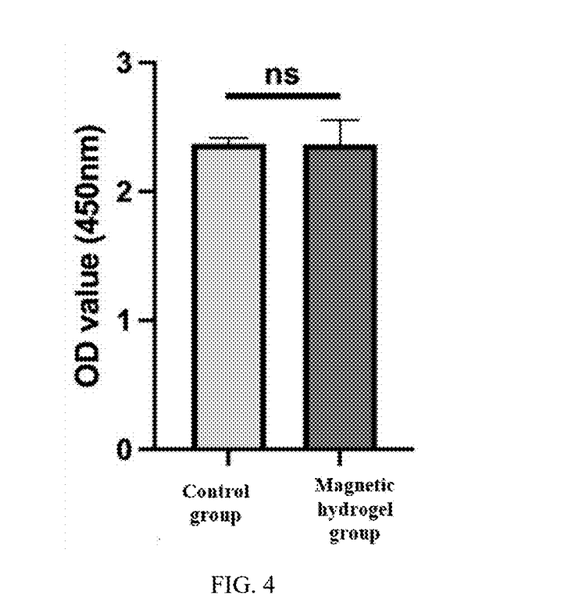
FIG. 4 illustrates a biocompatibility test diagram of the magnetic hydrogel of GA-Al@NdFeB.

Since the magnetic hydrogel of GA-Al@NdFeB is intended to be applied on two sides of the wound in subsequent applications, it is necessary to evaluate that the magnetic hydrogel of GA-Al@NdFeB has excellent biocompatibility to ensure that it does not cause any adverse reactions when in contact with human and animal skin. To assess this property, the magnetic hydrogel of GA-Al@NdFeB is soaked in complete Dulbecco's Modified Eagle Medium (DMEM) culture medium overnight. Fibroblasts are then cultured in the DMEM culture medium, and the cell viability is assessed using a cell counting kit-8 (CCK-8) assay after 48 hours, as shown in FIG. 4. The results of the CCK-8 assay indicate that the cell viability in the magnetic hydrogel of GA-Al@NdFeB group is comparable to that of a control group, with no statistically significant differences. This demonstrates that the magnetic hydrogel of GA-Al@NdFeB is non-cytotoxic, confirming its biological safety for subsequent in vivo animal experiments and further clinical applications.

6. Fabrication of Mechanical Loading Devices of Different Sizes and in Vivo Animal Experiments.

Figure 5:
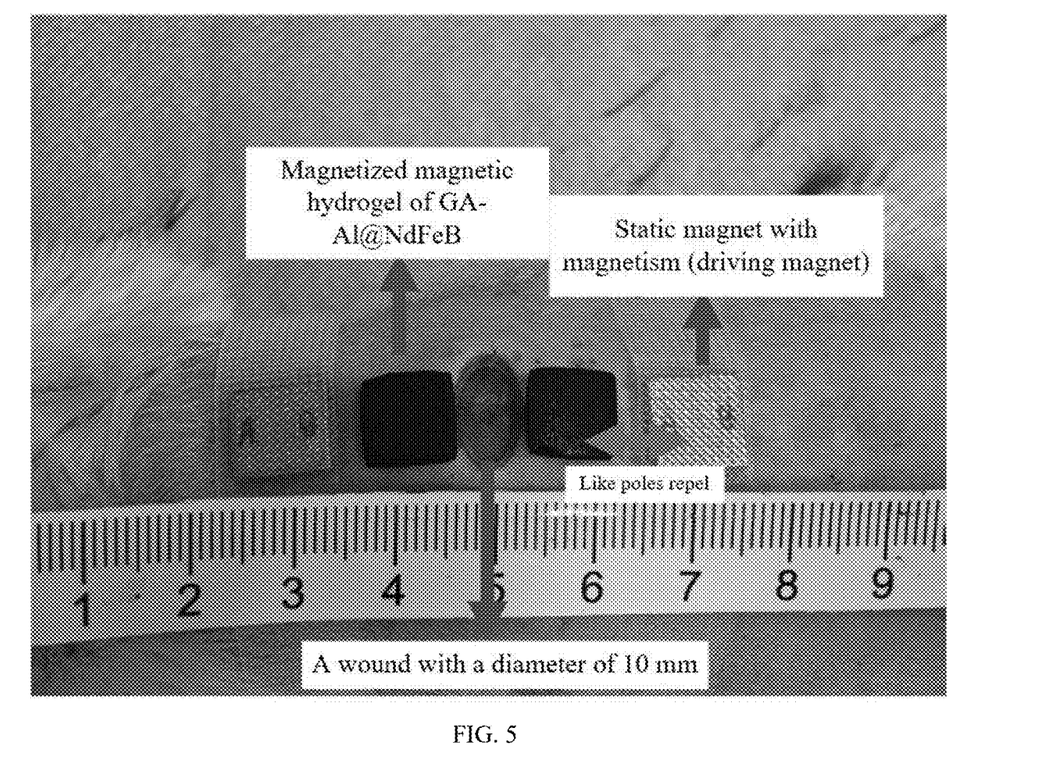
FIG. 5 illustrates an experimental application diagram of a non-invasive skin mechanical loading device on an animal body.

Rats weighing approximately 330 g are selected for wound model construction in a 4 mm group, a 2 mm group, and a control group. For wound model construction, the rats are anaesthetized, shaved, and depilated. A full-thickness skin defect (wound) with a diameter of 10 mm is created at the midline of the rat's back using surgical scissors. The wounds are treated according to the following groups, as shown in FIG. 5.

A. 4 mm group wound treatment: A pair of the magnetized magnetic hydrogels f GA-Al@NdFeB are placed along the rat's body long axis and attached to the wound edges using clinical surgical glue, with opposite magnetic poles. On each side of the magnetic hydrogel of GA-Al@NdFeB, a driving magnet is positioned 4 mm away, aligned with the same magnetic pole, and secured using 3M medical breathable tape. This setup allowed the driving magnets to push the magnetic hydrogels, thereby promoting wound contraction. The wound is then covered with petroleum gauze, protected with 3M Scotch™ 2228 water-proof adhesive tape, and secured with adhesive bandages to fix the magnetic hydrogels of GA-Al@NdFeB, the driving magnets, and overall wound setup in place.

B. 2 mm group wound treatment: The difference from group A is that an arrangement position of the driving magnet is 2 mm away from the magnetic hydrogel of GA-Al@NdFEB, and other operations are the same.

C. Control group: After creating the wound, the wound is covered with petroleum gauze, protected with 3M Scotch™ 2228 water-proof adhesive tape, and secured with adhesive bandages to fix the overall wound setup.

All wounds are covered with Vaseline gauze, and photos are taken every three days to record sizes of the wounds and replace materials.

Figure 6:
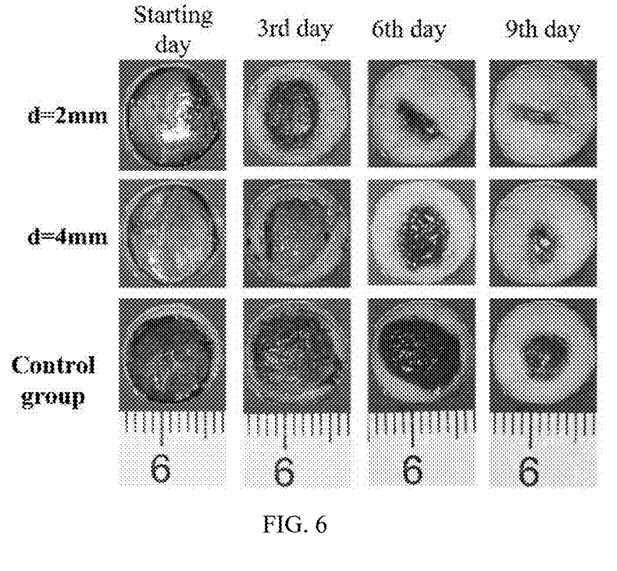
FIG. 6 illustrates a detection diagram of the non-invasive skin mechanical loading device promoting wound healing.

As shown in FIG. 6, a full-thickness skin defect (wound) with a diameter of 10 mm is created on the rat's back. The magnetic hydrogels and static magnets are applied on two sides of the wound. The distance between the static magnets and the magnetic hydrogels is set to two groups: 2 mm (distance between driving magnets and magnetized magnetic hydrogels of GA-Al@NdFeB is 2 mm, d=2 mm) and 4 mm (distance between driving magnets and magnetized magnetic hydrogels of GA-Al@NdFeB is 4 mm, d=4 mm). This setup allowed for mechanical loading of different magnitudes on the two sides of the wound. The wound healing progress is observed every three days, and the devices are replaced with new ones. The in vivo animal experiments showed that at each time point, the wound healing areas in the groups with distances of 2 mm and 4 mm are significantly larger than those in the control group. This indicates that mechanical loading on the two sides of the wound effectively promotes wound healing. Apparently, when the distance is adjusted to 2 mm, the wound healing is optimal, with nearly complete healing achieved by day 9. This suggests that increasing the mechanical force on the two sides of the wound can further enhance the healing process.

The NdFeB nanoparticles exhibit strong biocompatibility and can be conjugated with a variety of bioactive molecules. Based on their unique physicochemical properties, they have found applications in vitro diagnostics and clinical therapies, including cell diagnostics, tissue repair, drug delivery, magnetic resonance imaging (MRI), magnetic hyperthermia therapy, and magnetofection. The NdFeB nanoparticles possess superparamagnetism, which means that they can display strong magnetism in the presence of an external magnetic field, but do not retain magnetism in the absence of such a field. In other words, the NdFeB nanoparticles themselves cannot generate a magnetic field, they only exhibit magnetism by responding to the external magnetic field. Therefore, the magnetic hydrogel based on the NdFeB nanoparticles is constructed by leveraging magnetic responsiveness of the NdFEB nanoparticles and the biocompatibility of the magnetic hydrogels. The magnetic hydrogel is used to apply mechanical loading to wounds, thereby promoting wound contraction and achieving the goal of wound repair.

Apparently, those skilled in the art can make various modifications and variations to the disclosure without departing from the spirit and scope of the disclosure. Thus, if these modifications and variations of the disclosure fall within the scope of the claims and their equivalent technologies, the disclosure is also intended to include these modifications and variations.

What is claimed is:

1. A non-invasive skin mechanical loading device, comprising:
   at least one pair of magnetized magnetic hydrogels of GA-Al@NdFeB, wherein magnetic poles of the at least one pair of magnetized magnetic hydrogels of GA-Al@NdFeB are opposite, the at least one pair of magnetized magnetic hydrogels of GA-Al@NdFeB are configured to be applied symmetrically on two sides of a skin wound, respectively, and are configured to be closely attached to edges of the two sides of the skin wound; and
   driving magnets, wherein the driving magnets correspond to the at least one pair of magnetized magnetic hydrogels of GA-Al@NdFeB in a one-to-one manner, and each of the driving magnets is arranged on a side of corresponding one of the at least one pair of magnetized magnetic hydrogels of GA-Al@NdFEB far away from the skin wound; the driving magnets are configured to oppositely push the skin wound from the two sides of the skin wound; magnetic poles of the driving magnets are the same as the magnetic poles of the at least one pair of magnetized magnetic hydrogels of GA-Al@NdFeB, respectively, thereby generating repulsive forces between the driving magnets and the at least one pair of magnetized magnetic hydrogels of GA-Al@NdFeB, and the at least one pair of magnetized magnetic hydrogels of GA-Al@NdFEB are configured to be pushed by the repulsive forces to achieve a traction wound contraction;
   wherein a preparation method of each magnetized magnetic hydrogel of GA-Al@NdFeB comprises:
      mixing a gelatin solution, a sodium alginate solution, deionized water, and neodymium iron boron (NdFeB) particles thoroughly to obtain a reaction precursor A solution;
      mixing calcium carbonate, gluconolactone, transglutaminase, and deionized water thoroughly to obtain a reaction precursor B solution; and
      adding the reaction precursor solution A into the reaction precursor solution B, then stirring thoroughly and mixing to obtain a mixture, followed by sealing the mixture to place in a constant-temperature environment to obtain a magnetic hydrogel of GA-Al@NdFeB; magnetizing the magnetic hydrogel of GA-Al@NdFeB, thereby endowing the NdFEB particles embedded within the magnetic hydrogel of GA-Al@NdFeB with magnetic polarity to obtain the magnetized magnetic hydrogel of GA-Al@NdFeB.

2. The non-invasive skin mechanical loading device as claimed in claim 1, wherein the preparation method comprises:
   mixing the gelatin solution with a mass percentage in a range of 18% to 22%, the sodium alginate solution with a mass percentage in a range of 0.8% to 1.2%, the deionized water, and the NdFeB particles thoroughly to obtain the reaction precursor A solution; and
   before obtaining the magnetic hydrogel of GA-Al@NdFEB, adding the reaction precursor solution A into the reaction precursor solution B, then stirring thoroughly and mixing to obtain the mixture, followed by sealing the mixture to place in the constant-temperature environment with a temperature in a range of 37° C. to 40° C. for 2 hours (h) to 3 h.

3. The non-invasive skin mechanical loading device as claimed in claim 1, wherein a volume-to-weight ratio of the gelatin solution, the sodium alginate solution, the deionized water, and the NdFeB particles is 10:5:1:10, and a volume-to-weight ratio of the calcium carbonate, the gluconolactone, the transglutaminase, and the deionized water is 0.02:0.04:0.2:4.

4. The non-invasive skin mechanical loading device as claimed in claim 1, wherein a particle size of the NdFeB particles is in a range of 5 micrometers ($\mu$m) to 10 $\mu$m.

5. The non-invasive skin mechanical loading device as claimed in claim 1, configured to change distances between the driving magnets and the magnetized magnetic hydrogels of GA-Al@NdFeB, to thereby control the repulsive forces.

* * * * *